United States Patent
Ossenbruegge et al.

[11] Patent Number: 6,125,877
[45] Date of Patent: Oct. 3, 2000

[54] VALVE

[75] Inventors: Jan-Peter Ossenbruegge, Langenhagen; Ralf Hiddessen, Lehrte, both of Germany

[73] Assignee: Nass Magnet GmbH, Germany

[21] Appl. No.: 09/166,702

[22] Filed: Oct. 5, 1998

[30] Foreign Application Priority Data

Oct. 31, 1997 [DE] Germany ............................ 197 48 263

[51] Int. Cl.$^7$ ............................ F16K 31/02; F16K 25/00
[52] U.S. Cl. ................ 137/315.03; 251/359; 251/129.06
[58] Field of Search .............................. 251/359, 129.06, 251/363, 333; 137/315.03, 15.18

[56] References Cited

U.S. PATENT DOCUMENTS

| | | | |
|---|---|---|---|
| 3,250,510 | 5/1966 | Williams | 251/363 X |
| 3,456,915 | 7/1969 | Smolen | 251/363 X |
| 3,554,487 | 1/1971 | Vesco | 251/363 X |
| 4,006,883 | 2/1977 | Hilsheimer | 251/363 X |
| 4,535,810 | 8/1985 | Duder et al. | 137/596.17 |
| 4,617,952 | 10/1986 | Fujiwara et al. | 251/129.06 X |
| 4,877,218 | 10/1989 | Kasner | 251/61.3 |
| 5,483,991 | 1/1996 | D'Agostino et al. | 251/363 X |
| 5,612,969 | 3/1997 | Dombi | 372/75 |
| 5,779,218 | 7/1998 | Kowanz | 251/129.06 |

FOREIGN PATENT DOCUMENTS

WO 97/09555  3/1997  WIPO.

*Primary Examiner*—John Rivell
*Assistant Examiner*—Meredith H. Schoenfeld
*Attorney, Agent, or Firm*—Reising, Ethington, Barnes, Kisselle, Learman & McCulloch, P.C.

[57] ABSTRACT

The invention relates to a valve with a housing, a valve seat and a setting member which is provided in the housing and has a seal, the sealing surface of which comes into contact with the valve seat in the closed position of the setting member, and wherein during the adjustment the valve seat is retained on the housing so as to be displaceable relative to the sealing surface. During the adjustment the valve seat is also movable in an angular range in such a way that the valve seat rests flat on the sealing surface in the closed position.

11 Claims, 1 Drawing Sheet

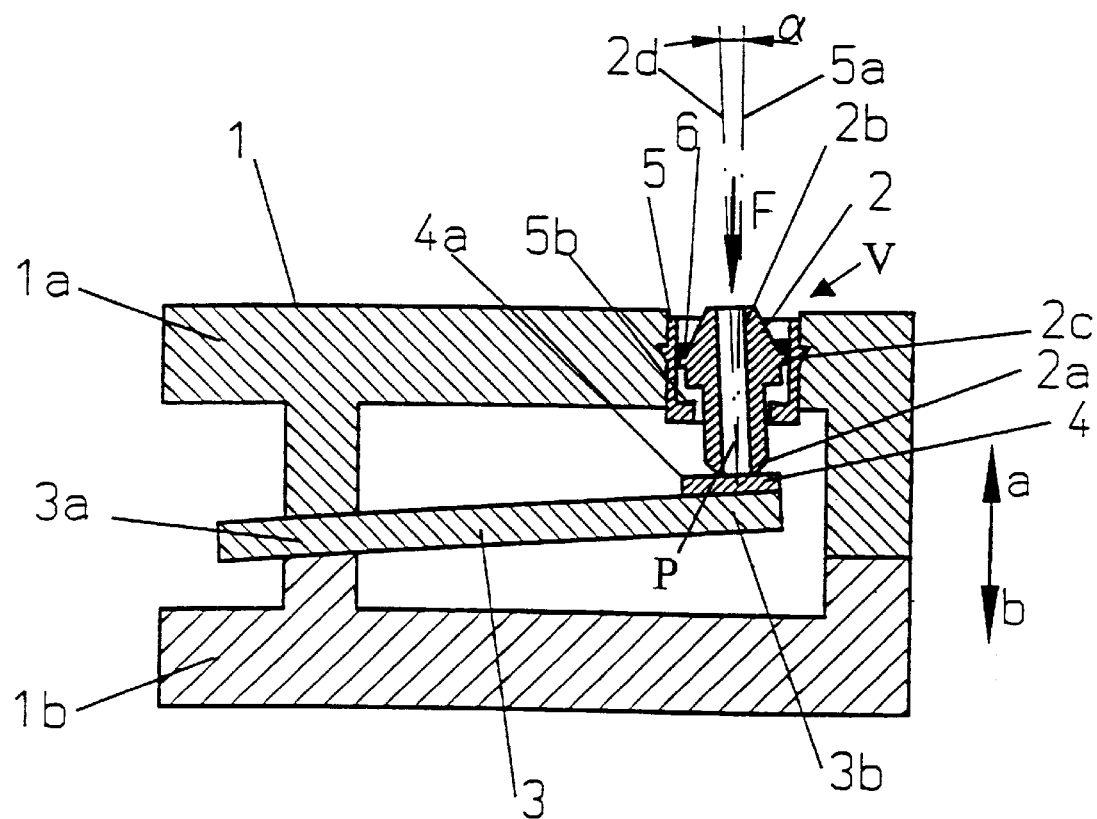

VALVE

The invention relates to a valve having a housing, a valve body and a setting member which is provided in the housing and has a seal, the sealing surface of which comes into contact with the valve seat in the closed position of the setting member.

BACKGROUND OF THE INVENTION

In order to ensure a good closing contact, possible adjustment means for the valve seat have already been proposed. In WO97/09555 it is proposed to provide the valve seat on a tube which is displaceably inserted in a bore in the housing and is for example glued after adjustment relative to the sealing surface. Thus in the case of this type of adjustment it is ensured that in closing contact the sealing surface comes into contact with the valve seat.

By the use of correspondingly soft seal it is possible to compensate for further manufacturing tolerances in order to achieve a tight closure of the valve seat in the closed position. However, if setting members are used which only have a relatively small travel of for example 1/10 to 2/10 mm, the seals must be of substantially harder construction in order to free the valve seat to a sufficient extent in the open position. Also in the case of such a construction of the valve in order to achieve a tight closure of the valve in the closed position, the valve seat and the sealing surface must be aligned with one another as well as possible.

SUMMARY OF THE INVENTION

An object of the invention is to provide a valve of such construction that, even if the setting member has only a small travel, a tight seal in the closed position of the valve can be achieved.

According to the invention this object is achieved in that, during the adjustment of the setting member, the valve body is also movable in an angular range in such a way that the valve seat rests flat on the sealing surface in the closed position.

In a preferred embodiment, during adjustment the valve body is guided loosely in a bush fixed on the housing and is glued to the bush after adjustment.

Further advantages and embodiments of the invention are explained in greater detail with reference to the following description and the drawing.

THE DRAWING

The single drawing FIGURE is a sectional view through a valve and housing constructed according to the invention, the valve being shown in its closed position.

The illustrated valve construction consists essentially of a housing 1, a valve body V having a tapered end 2 and a setting member 3 which is provided in the housing and has a seal 4, the sealing surface 4a of which comes into contact with the valve body 2 in the illustrated closed position of the setting member 3. The valve body has a passageway P extending axially therethrough.

In the illustrated embodiment the housing I is formed by an upper and a lower housing half 1a, 1b. The setting member is gripped with one end 3a between these two housing halves, whilst the other end 3b bears the seal 4. The gripped end 3a can also be additionally embedded in a filling material.

In the illustrated embodiment the setting member 3 is formed by a piezoelectric bending element. However, a magnet could also be used for example as actuator.

A bush 5 is fixed on the housing 1 to guide the valve body V and engage the valve end 2. The bush 5 is for example pressed into a bore in the housing.

During the adjustment the valve body V is initially loosely guided in the cylindrical bush 5. The valve body is essentially of tubular construction with a first and a second end 2a, 2b, wherein the first end 2a comes into contact with the sealing surface 4a and furthermore a circumferential bead-like projection or flange 2c is provided in the region between the two ends 2a, 2b. Thus this bead-like projection 2c has a substantially greater diameter than the other regions of the valve body. The end 2a terminates in a flat plane normal to the passageway.

The diameter of the bead-like projection 2c is slightly smaller than the internal diameter of the bush 5.

The bush 5 has a central axis 5a, in the direction of which the valve body is displaceable. Since the valve body 2, apart from the bead-like projection 2a, has a substantially smaller external diameter by comparison with the internal diameter of the bush 5, the valve body is also movable in an angular range. In the illustrated embodiment the valve body has a central axis 2d which with the central axis 5a of the bush encloses an angle $\alpha$.

Since the setting member 3 is movable not only in the longitudinal direction of the central axis 5a but also in a certain angular or arcuate range, the valve body can be adjusted in such a way that in the illustrated closed position it rests with its lower end 2a flat on the sealing surface 4a.

Due to manufacturing tolerances and/or the construction of the setting member the sealing surface 4a is usually not constructed perpendicular to the central axis 5a of the bush. In order to make this effect clear, the setting member 3 in the illustrated embodiment is installed inclined in a manner which is exaggerated in the drawing. If the setting member 3 were movable only in the direction of the central axis 5a, the valve end 2a would not rest flat on the sealing surface 4a. This inaccuracy would then have to be compensated for by a correspondingly soft seal 4 in order to ensure a tight valve seal. If the travel of the setting member 3 in the region of the seal 4 is only very small, for example only 1/10 mm, then the seal 4 must be of relatively hard construction. In order also in this case to ensure sufficient sealing of the valve passageway, during the adjustment the valve seat is also movable in such a way in an angular range.

During the adjustment of the valve the body 2 is introduced into the bush 5 and placed with its first end 2a directly onto and perpendicular to the sealing surface 4a, as shown in the drawing, and fixed in this position by glueing. In this case the glue 6 is applied principally in the region of the bead-like projection 2c and the inner wall of the bush 5. In order largely to prevent the glue 6 from running into the interior of the housing, the external diameter of the bead-like projection 2c should be only slightly smaller than the internal diameter of the bush 5. Furthermore, the extent of the bead-like projection 2c in the direction of the central axis 2d should also be only very small in order to allow the greatest possible angle of tilt $\alpha$ relative to the central axis 5a.

In order to prevent the glue 6 from running into the interior of the housing, the bush 5 can, as in the illustrated embodiment, have a flange-like projection 5b extending in the direction of the central axis 5a on the end facing the interior of the housing.

Whilst the housing is made for example from plastics material, the bush 5 and the valve should advantageously be produced from metal. Because they are produced from metal, substantially smaller tolerances are possible for the gap between the bead-like projection 2c and the bush, so that the glue 6 can effect a seal between the valve body V and the bush and be prevented from running through very much into the valve.

The adjustment of the valve seat 2 can take place solely due to gravity or due to an external force F. The application and alignment of the valve body 2 before glueing can be favoured by a shaking movement through the setting member itself (pulsating excitation voltage) or by an external excitation.

The setting of a mechanical initial tension can be achieved not only by an external force F but also by deflection of the setting member in the direction of the arrow b.

So long as the setting member 3 is in its rest position it should have a certain spacing from the valve end 2a the adjustment of the valve can take place by the application of a distance piece onto the sealing surface 4a. A further possibility of setting a certain spacing is to deflect the setting member in the direction of the arrow b.

As soon as the valve is aligned, this is fixed in its position in the bush 5 with glue 6.

In order to prevent parts from becoming stuck in the interior of the valve, instead of or in addition to the projection 5b of the bush a UV light hardening glue can also be used, the interior of the valve being illuminated with UV light which ensures immediate hardening of the glue running through it.

We claim:

1. A valve construction comprising a housing having a passage therein, said passage having a longitudinal axis; a valve body occupying said passage and having an axially extending passageway therein, said valve body having opposite ends and terminating at one end in a plane end surface substantially normal to said passageway; a setting member carried by said housing for movement of one end thereof in an arcuate path, said valve body initially being capable of adjustment axially of said passage and angularly relative to said longitudinal axis, thereby enabling said valve body to be adjusted to a final position in which said end surface of said valve body may seat on said one end of said setting member and form a seal for said passageway; and maintaining means reacting between said valve body and said housing following adjustment of said valve body to said final position for maintaining said valve body in said final position.

2. The construction according to claim 1 wherein said maintaining means fixes said valve body in said final position.

3. The construction according to claim 1 wherein said maintaining means comprises an adhesive.

4. The construction according to claim 3 wherein said adhesive is ultraviolet light-hardening.

5. The construction according to claim 3 wherein said adhesive forms a seal between said passage and said valve body.

6. The construction according to claim 1 including an annular bush occupying said passage and within which said valve body is accommodated.

7. The construction according to claim 1 wherein said valve body includes between its ends an annular projection.

8. The construction according to claim 7 wherein said maintaining means encircles said valve body between said projection and said one end of said valve body.

9. The construction according to claim 6 wherein said bush has an annular flange extending toward said valve body.

10. The construction according to claim 1 wherein said setting member comprises a piezoelectric bending arm.

11. The construction according to claim 1 including a sealing surface carried by said setting member and upon which said end surface of said valve body may bear.

* * * * *